(12) United States Patent
Son

(10) Patent No.: US 12,301,951 B2
(45) Date of Patent: May 13, 2025

(54) DISPLAY DEVICE AND OPERATION METHOD FOR SAME

(71) Applicant: LG ELECTRONICS INC., Seoul (KR)

(72) Inventor: Chulmin Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 269 days.

(21) Appl. No.: 17/921,462

(22) PCT Filed: Apr. 27, 2020

(86) PCT No.: PCT/KR2020/005535
§ 371 (c)(1),
(2) Date: Oct. 26, 2022

(87) PCT Pub. No.: WO2021/221186
PCT Pub. Date: Nov. 4, 2021

(65) Prior Publication Data
US 2023/0188799 A1 Jun. 15, 2023

(51) Int. Cl.
G06F 9/451 (2018.01)
G06F 9/4401 (2018.01)
G06F 40/263 (2020.01)
G06N 3/08 (2023.01)
H04N 21/466 (2011.01)
H04N 21/485 (2011.01)

(52) U.S. Cl.
CPC ....... H04N 21/4856 (2013.01); G06F 9/4401 (2013.01); G06F 40/263 (2020.01); G06N 3/08 (2013.01); H04N 21/4667 (2013.01)

(58) Field of Classification Search
CPC ... G06F 9/454; G06F 40/263; H04M 1/72448
See application file for complete search history.

(56) References Cited

U.S. PATENT DOCUMENTS

| 8,788,259 | B1 | 7/2014 | Buryak et al. |
| 9,197,772 | B2 * | 11/2015 | McKinney ......... H04N 1/00498 |
| 9,304,787 | B2 * | 4/2016 | Oldham ................ G10L 15/005 |
| 9,953,630 | B1 * | 4/2018 | Aubrey ................... G06F 9/454 |
| 10,635,298 | B2 * | 4/2020 | Master .................. G06F 40/263 |
| 10,868,930 | B2 * | 12/2020 | Schleede ............ H04N 1/00511 |
| 2006/0053013 | A1 | 3/2006 | Aubauer et al. |

(Continued)

FOREIGN PATENT DOCUMENTS

| CN | 109460270 A | 3/2019 |
| KR | 10-2008-0016206 A | 2/2008 |
| KR | 10-2016-0030663 A | 3/2016 |

Primary Examiner — Daniel Abebe
(74) Attorney, Agent, or Firm — Birch, Stewart, Kolasch & Birch, LLP

(57) ABSTRACT

According to an embodiment of the present disclosure, a display device includes a display, a communication interface configured to communicate with an external device, and a processor configured to receive language usage information of a user, determine a main language of the user based on the language usage information, compare a set system language with the main language, and when the system language is different from the main language, change the system language such that the system language is set to the main language or perform suggestion that the system language is set to the main language.

14 Claims, 14 Drawing Sheets

(56) References Cited

U.S. PATENT DOCUMENTS

2015/0062605 A1\* 3/2015 McKinney .............. G06F 9/454
 358/1.13
2017/0031897 A1\* 2/2017 Zhang .................. H04M 1/724
2018/0089175 A1 3/2018 Matsuoka \* cited by examiner

FIG. 11

| TYPE OF LANGUAGE USAGE INFORMATION | WEIGHT | PRIORITY |
|---|---|---|
| SYSTEM LANGUAGE OF USER TERMINAL | 1 | FIRST PRIORITY |
| LANGUAGE OF USER'S SPOKEN VOICE | 0.5 | SECOND PRIORITY |
| LANGUAGE OF SUBTITLE OF MEDIA CONTENT | 0.3 | THIRD PRIORITY |
| LANGUAGE OF VOICE OF MEDIA CONTENT | 0.1 | FIFTH PRIORITY |
| CONTENT- LANGUAGE ENTITY OF WEB SITE | 0.15 | THIRD PRIORITY |
| LANGUAGE OF TEXT INCLUDED IN WEB PAGE 0.05 | 0.05 | FOURTH PRIORITY |

FIG. 12

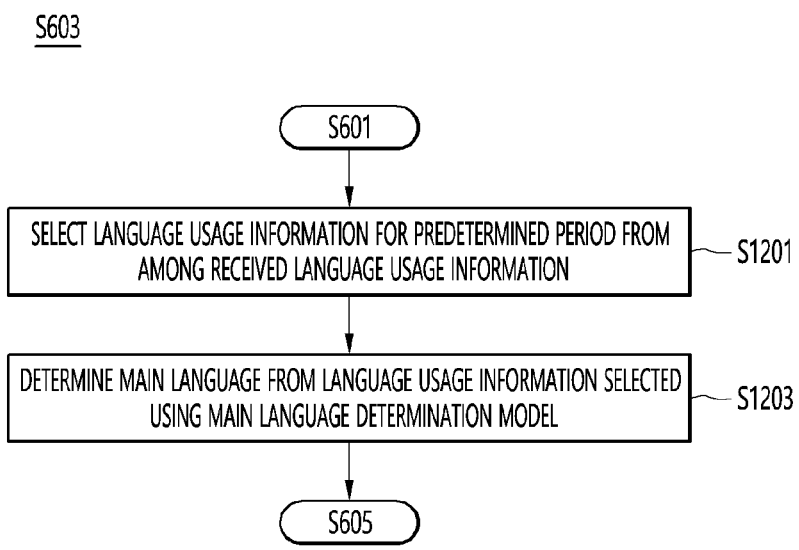

DISPLAY DEVICE AND OPERATION METHOD FOR SAME

CROSS REFERENCE TO RELATED APPLICATIONS

This application is the National Phase of PCT International Application No. PCT/KR2020/005535, filed on Apr. 27, 2020, which is hereby expressly incorporated by reference into the present application.

TECHNICAL FIELD

The present disclosure relates to a display device for updating a set system language and an operating method thereof.

BACKGROUND ART

Each user has his or her preferred and most used language, which may be different. Accordingly, system languages preferred by users may be different in a display device used by multiple users, such as a display device installed in a building lobby or a display device in a guest room of a lodging facility.

Conventionally, each user has to manually set the system language of the display device when the system language set in the display device is not his/her preferred language. When the user has to manually set the system language, it may cause great inconvenience to the user. In particular, when the previously set system language is a language that the user does not know, there is a problem in that it is difficult to modify the system language.

DISCLOSURE

Technical Problem

An object of the present disclosure is to provide a display device for updating a set system language by determining a system language suitable for a current user and automatically changing the set system language or suggesting a change of a system language to a user, and an operating method thereof.

Another object of the present disclosure is to provide a display device for determining whether to automatically change a system language after determining a current user's main language, and an operating method thereof.

Technical Solution

According to an embodiment of the present disclosure, a display device includes a display, a communication interface configured to communicate with an external device, and a processor configured to receive language usage information of a user, determine a main language of the user based on the language usage information, compare a set system language with the main language, and when the system language is different from the main language, change the system language such that the system language is set to the main language or perform suggestion that the system language is set to the main language.

The language usage information may include at least one of a content-language entity of an HTTP response received from a website, language information of text included in a web page, language information of voice of media content, language information of subtitles of the media content, language information of the user's spoken voice, and system language information of a user terminal.

The processor may select language usage information for a predetermined period from among the language usage information, assign a weight to each of the selected language usage information, and determine the main language in consideration of the weight corresponding to each of the selected language usage information.

The processor may assign a higher time weight to each of the selected language usage information as an elapsed time is shorter, assign a predetermined type weight to each of the selected language usage information for each type of language usage information, and calculate an overall weight based on the time weight and the type weight.

The processor may calculate a sum of the overall weights for each language based on the overall weight calculated for each of the selected language usage information, and determine a language having a largest sum of the overall weights as the main language.

The processor may determine the main language in consideration of a weight corresponding to the selected language usage information and a predetermined priority for each type of language usage information.

The processor may select a first language usage information having a highest priority from among the selected language usage information, and determine the main language in consideration of a weight of the first language usage information.

A priority of the system language of the user terminal may be higher than a priority of other language usage information, and a priority of the language of the subtitles of the media content may be higher than a priority of the language of the voice of the media content.

The processor may select language usage information for a predetermined period from among the language usage information, and determine the main language using the selected language usage information and a main language determination model, and the main language determination model may be a model including an artificial neural network (ANN), the model being trained based on a machine learning algorithm or a deep learning algorithm.

The main language determination model may be a model that includes a Recurrent Neural Network (RNN), and determines and outputs the main language when the language usage information is input in real time.

The processor may generate learning data corresponding to information on a used language and a result of change when changing or attempting to change the system language, and the learning data may be used to update the main language determination model.

The processor may automatically change the system language such that the system language is set to the main language when the system language and the main language are different from each other, output a first notification indicating that the system language has been changed, and determine whether to cancel change of the system language based on an input of the user corresponding to the first notification in a case where a language update mode is an automatic update mode.

The processor may output a second notification suggesting change of the system language such that the system language is set to the main language when the system language and the main language are different from each other, output a first notification indicating that the system language has been changed, and determine whether to change the system language based on an input of the user corresponding to the second notification in a case where the language update mode is a manual update mode.

According to an embodiment, a method for operating a display device includes receiving language usage information of a user, determining a main language of the user based on the language usage information, comparing a set system language with the main language, and changing the system language such that the system language is set to the main language or performing suggestion that the system language is set to the main language, when the system language is different from the main language.

According to an embodiment, a recording medium recording a method of operating a display device includes receiving language usage information of a user, determining a main language of the user based on the language usage information, comparing a set system language with the main language, and changing the system language such that the system language is set to the main language or performing suggestion that the system language is set to the main language, when the system language is different from the main language.

Advantageous Effects

According to various embodiments of the present disclosure, it is possible to easily update system language settings even if a user does not select a system language to be updated by determining a system language suitable for a current user, thus increasing user convenience.

Further, according to various embodiments of the present disclosure, it is possible to determine whether to automatically update system language settings based on a user's usage pattern, thus providing a system language setting function with high satisfaction for each user.

DESCRIPTION OF DRAWINGS

FIG. 11 is a diagram illustrating an example of weights and priorities assigned to types of language usage information.

FIG. 12 is an operation flowchart illustrating an example of a step S603 of determining a main language based on the language usage information shown in FIG. 6.

MODE FOR INVENTION

Figure 1:
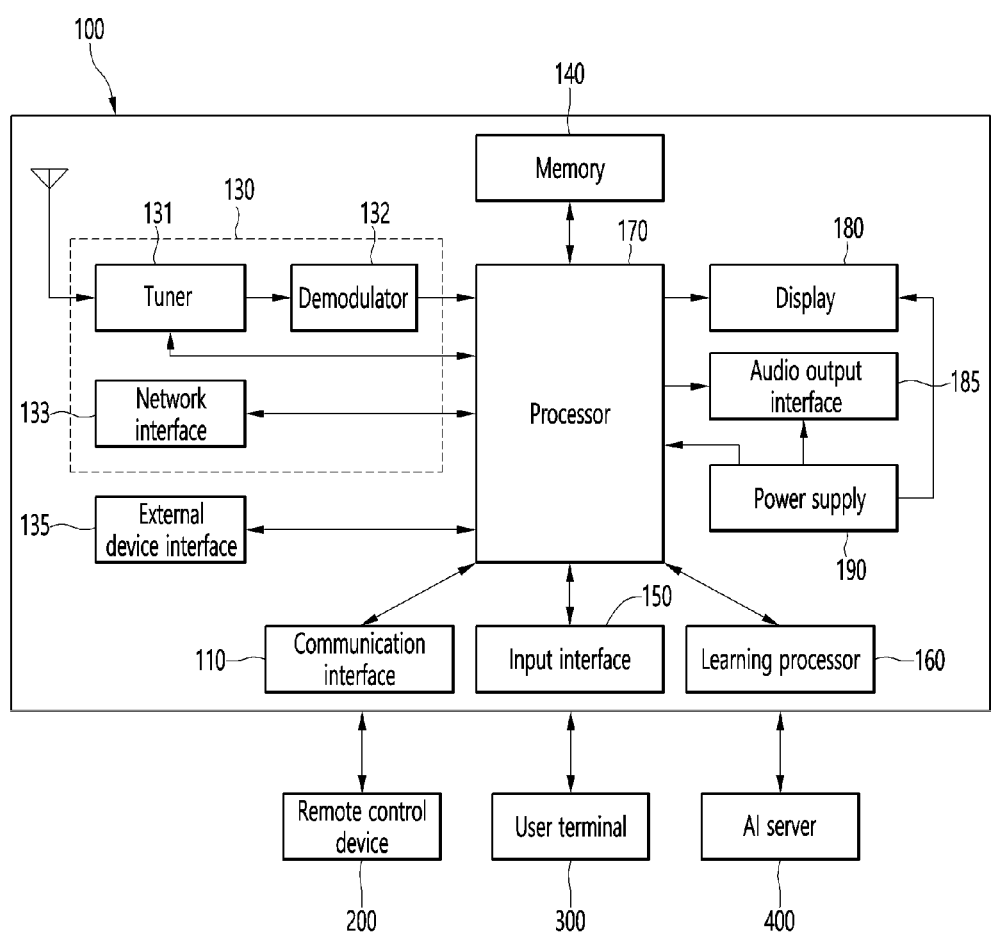
FIG. 1 is a diagram illustrating a display device according to an embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted. The suffixes "module" and "unit or portion" for components used in the following description are merely provided only for facilitation of preparing this specification, and thus they are not granted a specific meaning or function. In addition, when it is determined that the detailed description of the related known technology may obscure the gist of embodiments disclosed herein in describing the embodiments, a detailed description thereof will be omitted. Further, the accompanying drawings are intended to facilitate understanding of the embodiments disclosed herein, and the technical spirit disclosed herein are not limited by the accompanying drawings. Therefore, the present disclosure should be construed as including all the changes, equivalents, and substitutions included in the spirit and scope of the present disclosure.

The terms coming with ordinal numbers such as 'first', 'second', or the like may be used to denote various components, but the components are not limited by the terms. The terms are used merely for the purpose to distinguish a component from the other component.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

FIG. 1 is a block diagram showing a configuration of a display device according to an embodiment of the present disclosure.

Referring to FIG. 1, the display device 100 may be connected to at least one of a remote control device 200, a terminal 300, and an artificial intelligence server 400 to transmit/receive data or signals.

The display device 100 refers to a device capable of outputting an image including a display 180 or a display panel, and may be implemented by a stationary device or a mobile device, such as a TV, a projector, a mobile phone, a smartphone, a desktop computer, a laptop, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a digital signage, a robot, a vehicle, and the like.

The user terminal 300 may be implemented as a mobile phone, a smart phone, a tablet PC, a laptop, a wearable device, a PDA, or the like.

The display device 100 may include a communication interface 110, a broadcast receiver 130, an external device interface 135, a memory 140, an input interface 150, a processor 170, a display 180, a speaker 185, and a power supply circuit 190.

The communication interface 110 may perform a wired or wireless communication with an external electronic device. For example, the communication interface 110 may transmit and receive sensor information, a user input, a learning model, and a control signal to and from external devices, such as another display device. Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure.

The communication interface 110 may detect (or recognize) a wearable device capable of communication around the display device 100. Furthermore, if the detected wearable device is a device authenticated to communicate with the display device 100, the processor 170 can transmit at least part of data processed in the display device 100 to the wearable device through the communication interface 110. Therefore, a user of the wearable device may use data processed by the display device 100 through the wearable device.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The communication interface 110 may also be referred to as a communication modem or a communication interface.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed. For example, the memory 170 may store input data acquired by the input unit 120, learning data, a learning model, a learning history, and the like.

The memory 140 may perform a function for temporarily storing video, audio, or data signals input from an external device interface 135 or the network interface unit 133, and store information on a predetermined image through a channel storage function.

The memory 140 can store an application or an application list input from the external device interface 135 or the network interface unit 133.

The display device 100 may play back a content file (a moving image file, a still image file, a music file, a document file, an application file, or the like) stored in the memory 140 and provide the same to the user.

The input interface 150 may acquire various kinds of data. In this case, the input interface 120 may include a camera for inputting a video signal, a microphone for receiving an audio signal, and a user input unit for receiving information from a user.

The user input interface may transfer signals input by a user to the processor 170 or transfer signals from the processor 170 to a user. For example, the user input interface unit 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the processor 170 to the remote control device 200.

Additionally, the user input interface 150 may transfer, to the processor 170, control signals input from local keys (not shown) such as a power key, a channel key, a volume key, and a setting value.

The learning processor 160 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

In this case, the learning processor 160 may perform AI processing together with the learning processor 440 of the AI server 400.

At this time, the learning processor 160 may include a memory integrated or implemented in the display device 100. Alternatively, the learning processor 160 may be implemented by using the memory 170, an external memory directly connected to the display device 100, or a memory held in an external device.

Image signals that are image-processed in the processor 170 can be input to the display 180 and displayed as an image corresponding to corresponding image signals. Additionally, the image signals that are image-processed in the processor 170 can be input to an external output device through an external device interface 135.

The audio signal processed by the processor 170 may be output to the speaker 185. Also, the audio signal processed by the processor 170 may be input to the external output device through the external device interface 135.

The processor 170 may control overall operation of the recognition device 100.

Additionally, the processor 170 can control the display device 100 by a user command or internal program input through the user input interface and download a desired application or application list into the display device 100 in access to network.

The processor 170 may output channel information selected by a user together with processed image or voice signals through the display 180 or the speaker 185.

Additionally, according to an external device image playback command received through the user interface, the processor 170 can output image signals or voice signals of an external device such as a camera or a camcorder, which are input through the external device interface 135, through the display 180 or the speaker 185.

Moreover, the processor 170 can control the display 180 to display images and control broadcast images input through the tuner 131, external input images input through the external device interface 135, images input through the network interface unit, or images stored in the memory 140 to be displayed on the display 180. In this case, an image displayed on the display 180 can be a still image or video and also can be a 2D image or a 3D image.

Additionally, the processor 170 can play content stored in the display device 100, received broadcast content, and external input content input from the outside, and the content can be in various formats such as broadcast images, external input images, audio files, still images, accessed web screens, and document files.

The processor 170 may determine at least one executable operation of the display device 100 based on information determined or generated by using a data analysis algorithm or a machine learning algorithm. The processor 170 may control the components of the display device 100 to execute the determined operation.

To this end, the processor 170 may request, search, receive, or utilize data of the learning processor 160 or the memory 140. The processor 180 may control the components of the display device 100 to execute the predicted operation or the operation determined to be desirable among the at least one executable operation.

The processor 170 may acquire intention information for the user input and may determine the user's requirements based on the acquired intention information.

The processor 170 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 160, may be learned by the learning processor 440 of an artificial intelligence server 400, or may be learned by their distributed processing.

The processor 170 may collect history information including the operation contents of the display device 100 or the user's feedback on the operation and may store the collected history information in the memory 150 or the learning processor 160 or transmit the collected history information to the external device such as the AI server 400. The collected history information may be used to update the learning model.

The display 180 may convert image signals, data signals, and OSD signals processed by the processor 170, or image signals or data signals received from the external device interface 135 into R, G, and B signals to output images.

Meanwhile, the display device 100 illustrated in FIG. 1 is merely an embodiment of the present disclosure, and some of the illustrated components may be integrated, added, or omitted according to the specifications of the display device 100 that are actually implemented.

In an embodiment, two or more components of the display device 100 may be combined into one component, or one component may be divided into two or more components as necessary. In addition, a function performed in each block is for describing an embodiment of the present disclosure, and its specific operation or device does not limit the scope of the present disclosure.

According to an embodiment of the present disclosure, unlike the display device 100 shown in FIG. 1, the display device 100 may receive an image through the network interface unit 133 or the external device interface 135 without a tuner 131 and a demodulator 132 and play back the same. For example, the display device 100 may be divided into an image processing device, such as a set-top box, for receiving broadcast signals or content according to various network services, and a content playback device that plays back content input from the image processing device. In this case, an operation method of the display device according to an embodiment of the present disclosure will be described below may be implemented by not only the display device 100 as described with reference to FIG. 1 and but also one of an image processing device such as the separated set-top box and a content playback device including the display 180 the speaker 185.

Figure 2:
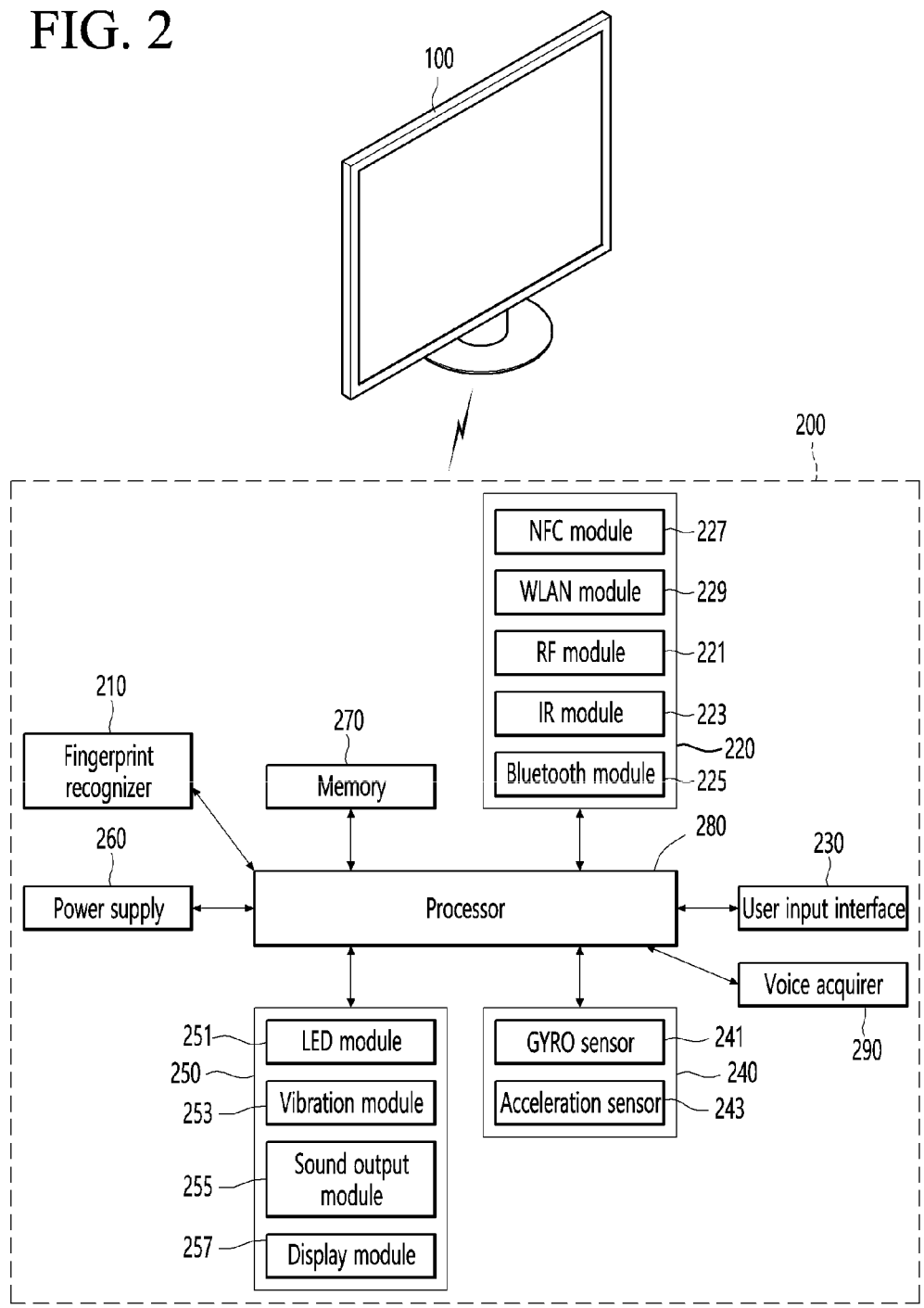
FIG. 2 is a block diagram illustrating a remote control device according to an embodiment of the present disclosure.

FIG. 2 is a block diagram illustrating a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key.

The sensor 240 may include a gyro sensor 241 or an acceleration sensor 243, and the gyro sensor 241 may sense information regarding the movement of the remote control device 200. For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100. The user may recognize whether the user input interface 230 is operated or whether the display device 100 is controlled through the output interface 250. For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

The power supply circuit 260 may supply power to the remote control device 200. The power supply unit 260 may stop power supply when the remote control device 200 has not moved for a predetermined time to reduce power consumption. The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band. The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication unit 225.

The microphone 290 may obtain a speech. The microphone 290 may include at least one microphone and obtain voice through the microphone 291.

Figure 3:
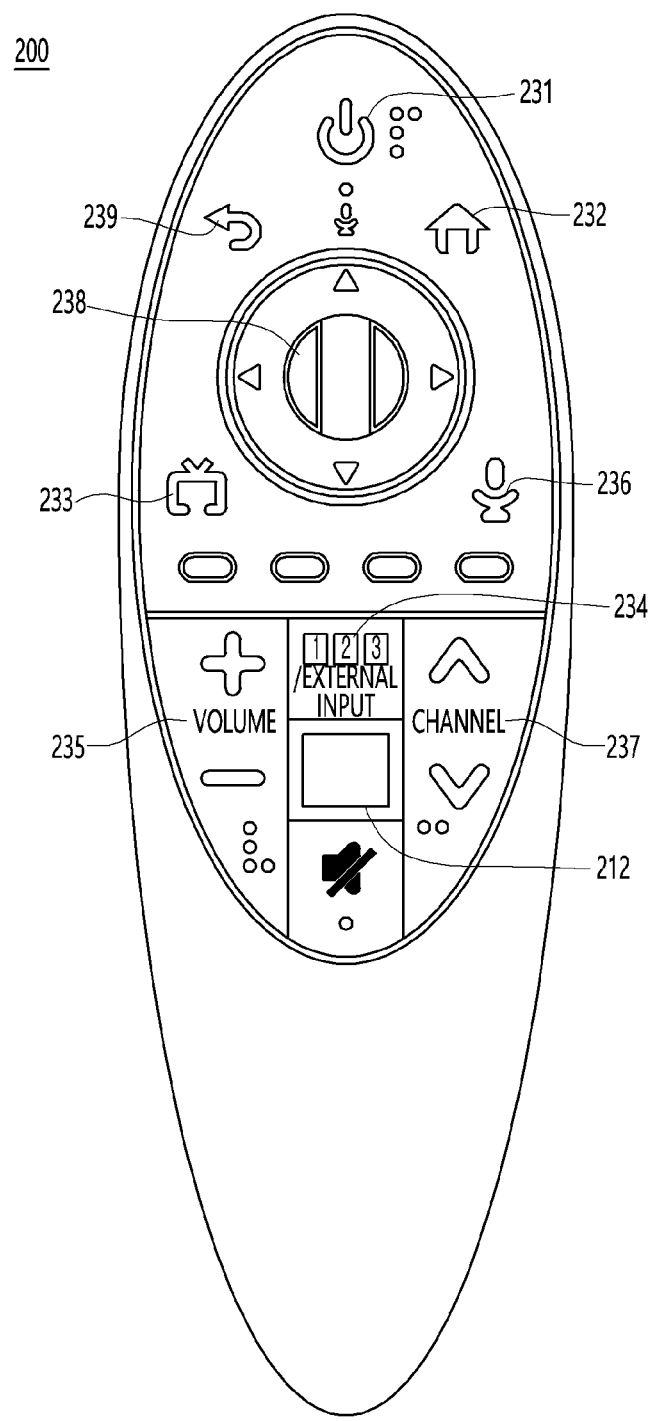
FIG. 3 is a diagram illustrating a remote control device according to an embodiment of the present disclosure.

FIG. 3 is a block diagram showing a remote control device 200 according to an embodiment of the present disclosure.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation. The power button 231 may be a button for turning on/off the power of the display device 100. The home button 232 may be a button for moving to the home screen of the display device 100. The live button 233 may be a button for displaying a real-time broadcast program. The external input button 234 may be a button for receiving an external input connected to the display device 100. The volume control button 235 may be a button for adjusting the level of the volume output by the display device 100. The voice recognition button 236 may be a button for receiving a user's voice and recognizing the received voice. The channel change button 237 may be a button for receiving a broadcast signal of a specific broadcast channel. The OK button 238 may be a button for selecting a specific function, and the back-play button 239 may be a button for returning to a previous screen.

Figure 4:
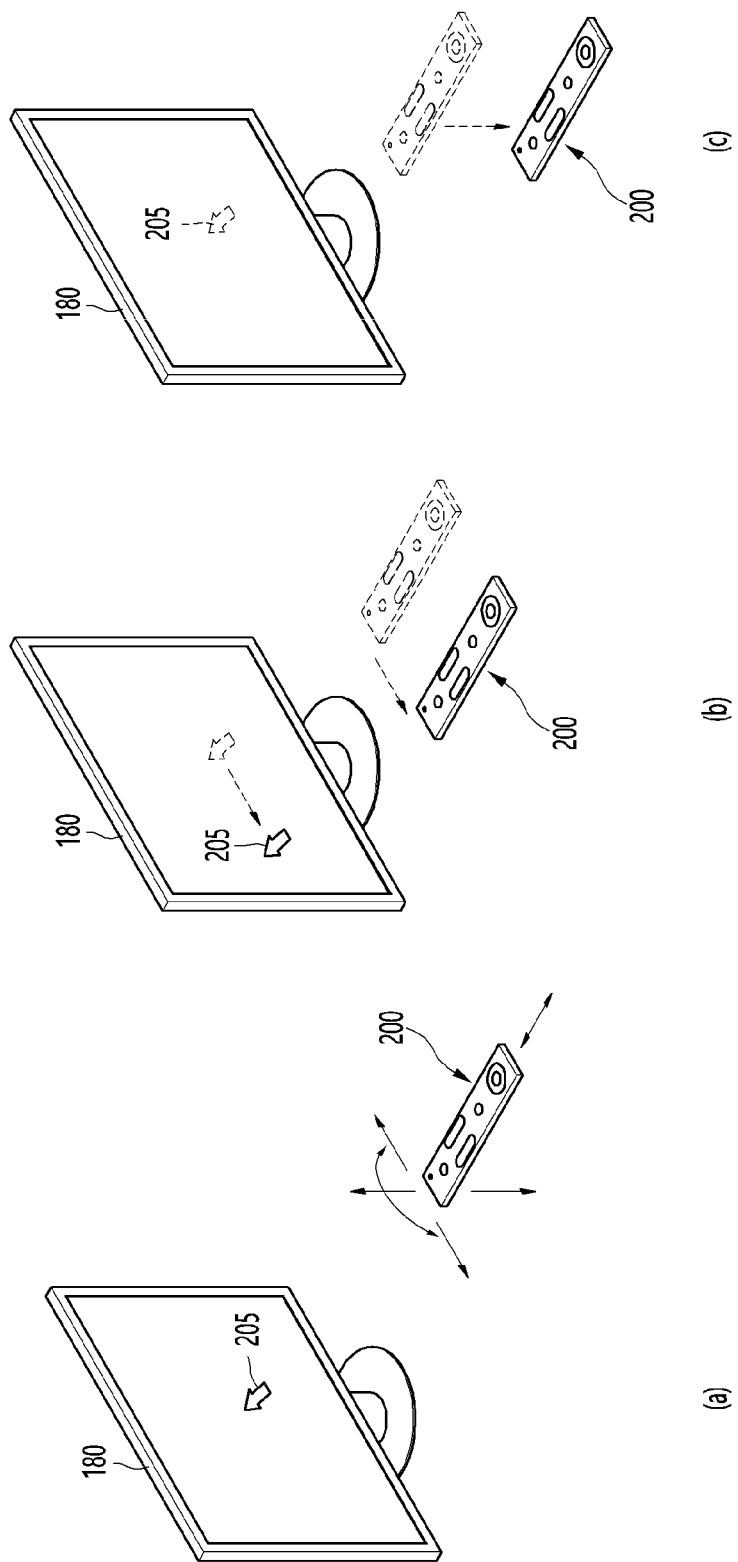
FIG. 4 shows an example of interworking with a display device through a remote control device according to an embodiment of the present disclosure.

FIG. 4 shows an example of interworking with the display device 100 through a remote control device 200 according to an embodiment of the present disclosure.

Referring to FIG. 4, a pointer 205 corresponding to the remote control device 200 may be displayed on the display 180.

Referring to (a) in FIG. 4, the user may move or rotate the remote control device 200 up, down, left and right.

The pointer 205 displayed on the display 180 of the display device 100 may move in correspondence with the movement of the remote control device 200. The pointer 205 is moved and displayed according to movement of the remote control device 200 in a 3D space, so the remote control device 200 may be called a space remote control device.

Referring to (b) in FIG. 4, when the user moves the remote control device 200 to the left, the pointer 205 displayed on the display 180 of the display device 100 may also move to the left correspondingly.

Information on the movement of the remote control device 200 detected through a sensor of the remote control device 200 may be transmitted to the display device 100. The display device 100 may calculate the coordinates of the pointer 205 based on information on the movement of the remote control device 200 and display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged. A selected area in the display 180 corresponding to the pointer 205 may be zoomed in and displayed enlarged. Conversely, when the user moves the remote control device 200 to be close to the display 180 while a specific button of the remote control device 200 is being pressed, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 5:
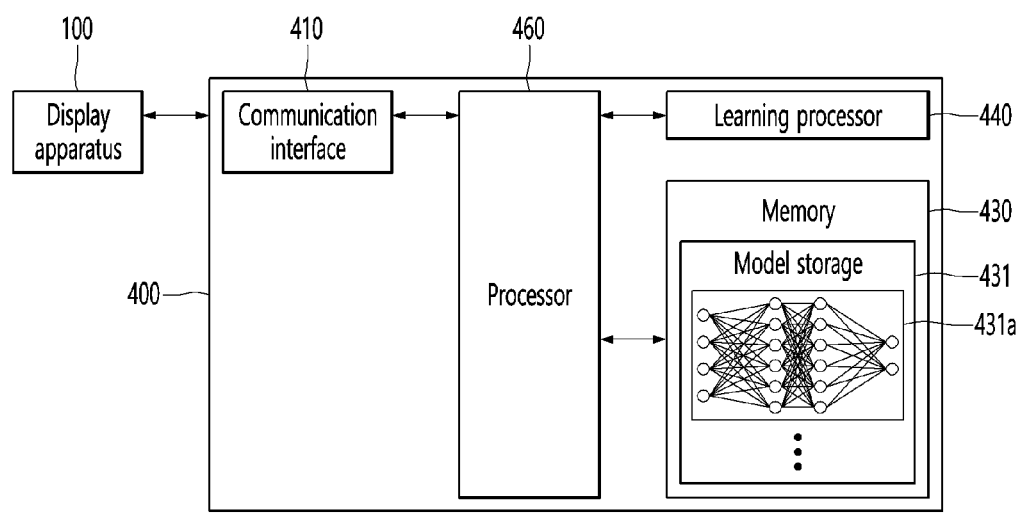
FIG. 5 is a block diagram illustrating an artificial intelligence server according to an embodiment of the present disclosure.

FIG. 5 is a block diagram illustrating an artificial intelligence (AI) server 400 according to an embodiment of the present disclosure.

Referring to FIG. 5, the AI server 400 may refer to a device that learns an artificial neural network by using a machine learning algorithm or uses a learned artificial neural network. The AI server 400 may include a plurality of servers to perform distributed processing, or may be defined as a 5G network.

The AI server 400 may perform at least part of the AI processing of the display device 100 together. The artificial intelligence processing may mean an operation required for training of an artificial intelligence model.

The AI server 400 may include a communication device 410, a memory 430, a learning processor 440, a processor 460, and the like.

The communication device 410 can transmit and receive data to and from an external device such as the display device 100.

The memory 430 may include a model storage 431. The model storage 431 may store a model 431*a* (or an artificial neural network), which is being trained or has been trained, through the learning processor 440.

The learning processor 440 may learn the artificial neural network 431*a* by using the learning data. The learning model may be used in a state of being mounted on the AI server 400 of the artificial neural network, or may be used in a state of being mounted on an external device such as the display device 100.

The learning model may be implemented in hardware, software, or a combination of hardware and software. If all or some of the learning models are implemented in software, one or more instructions that constitute the learning model may be stored in memory 430.

The processor 460 may infer the result value for new input data by using the learning model and may generate a response or a control command based on the inferred result value.

Figure 6:
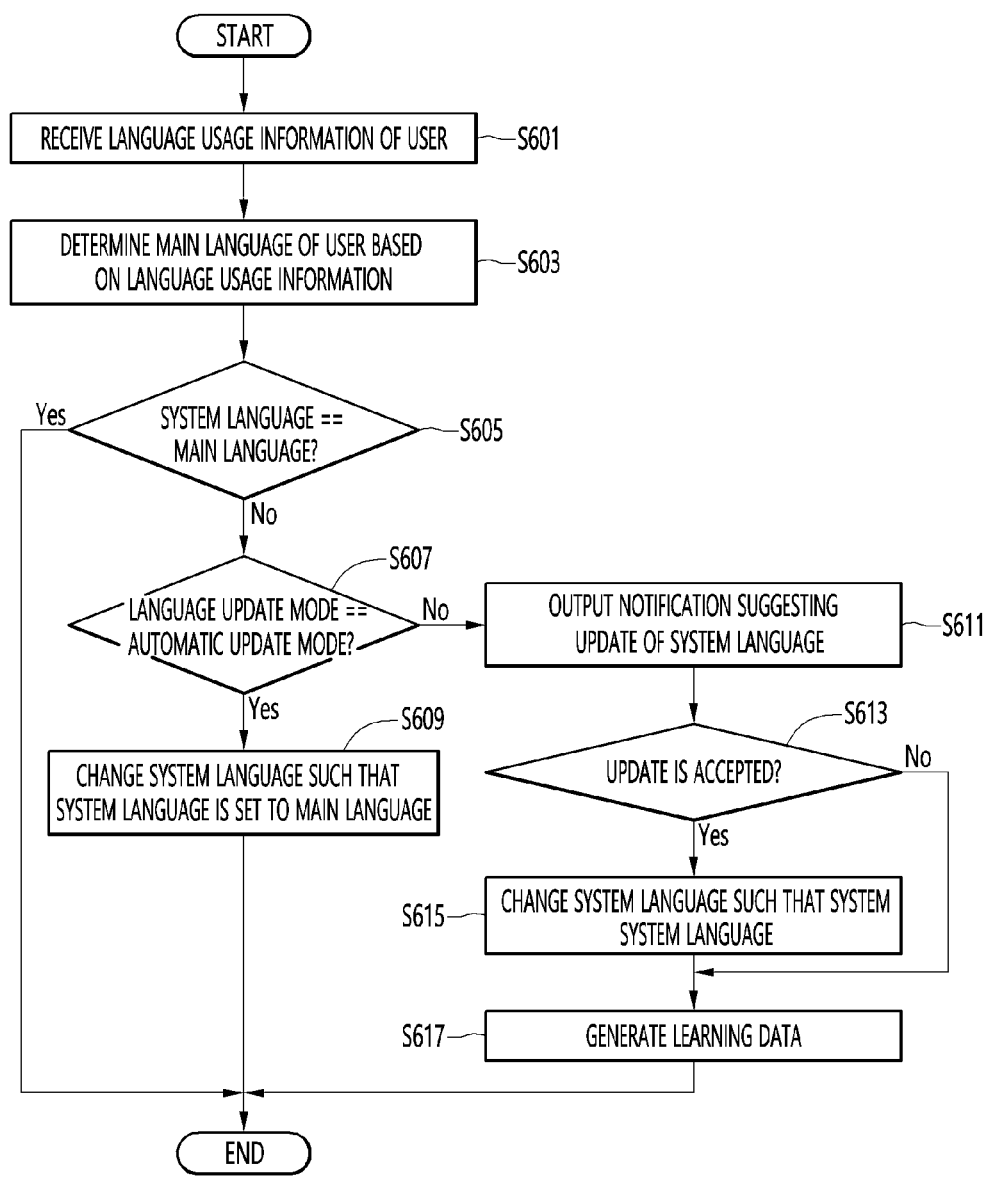
FIG. 6 is a flowchart showing a method of operating a display device according to an embodiment of the present disclosure.

FIG. 6 is a flowchart showing a method of operating a display device 100 according to an embodiment of the present disclosure.

Referring to FIG. 6, the processor 170 of the display device 100 may receive language usage information of a user (S601).

The language usage information of the user may include information about language used by the user terminal 300 as well as information about language used by the display device 100.

The language usage information of the user may include the content-language entity of an HTTP response received from a website during a web browsing process, the language information of text included in the web page, the language information of voice of media content, language information of subtitles of media content, language information of a user's spoken voice, system language information of the user terminal 300, and the like.

The content-language entity may be included in an HTTP response received from a website during a web browsing process through a web browser application of the display device 100. For example, when the content-language entity of the HTTP response received from a specific website is "en-US", this indicates that the language of the website is English.

The language information of voice of media content may mean the language information of a selected voice when the language of the voice of the media content is selectable.

The language information of subtitle of media content may mean the language information of a selected subtitle when the language of the subtitle corresponding to the media content is selectable.

The user's spoken voice may be received through the microphone of the input interface 150 or may be received from the user terminal 300 through the communication interface 110. The processor 170 may obtain the language information of the user's spoken voice by using a language discrimination model.

The language discrimination model may refer to a model that outputs a language corresponding to voice data when the voice data is input. The language discrimination model may include an artificial neural network (ANN), and may be trained using a machine learning algorithm or a deep learning algorithm. The language discrimination model may be trained by the processor 170 or the learning processor 160 of the display device 100, or may be trained by the processor 460 or the learning processor 440 of the AI server 400.

The language usage information may include time information. The time information included in the language usage information may be used to determine how old each language usage information is. In this regard, the system language information of the user terminal 300 may represent real-time information or may not include the real-time information. That is, the system language information may be state information.

Then, the processor 170 of the display device 100 may determine the user's main language based on the language usage information (S603).

The main language refers to a language mainly used by a user, and a language most frequently used may be determined as the main language. For example, when the user is browsing a web through a web browser application, and most of the visited web pages (e.g., 90% or more) are Korean web pages, the processor 170 may determine the user's main language as Korean. For example, when the user's spoken voice is Korean, the processor 170 may determine the user's main language as Korean. For example, when the user sets the language of subtitle of media content to Korean, the processor 170 may determine the user's main language as Korean. For example, when the display device 100 and the user terminal 300 interwork with each other and the system language of the user terminal 300 is Korean, the processor 170 may determine the user's main language as Korean.

However, since priorities or weights are different for pieces of language usage information, even a language that is not frequently used may be determined as the main language. The processor 170 may determine the user's main language in consideration of the weight or priority given to each language usage information with respect to the received language usage information.

In addition, the processor 170 may determine the main language by giving a higher weight to the language usage information for which the elapsed time is short in consideration of the time information of the received language usage information.

In an embodiment, the content-language entity of the HTTP response may have a higher priority than the language information of text included in a web page. In an embodiment, the language information of subtitle of the media content may have a higher priority than the language information of voice of media content. In an embodiment, the system language information of the user terminal 300 may have a higher priority than other language usage information.

Also, the processor 170 may determine the user's main language by using the main language determination model.

The main language determination model may refer to a model for determining (or discriminating) the user's main language from the language usage information of the user. That is, the main language determination model may be a model for outputting the main language of a corresponding user when the language usage information of the user is input.

The main language determination model may refer to a model for determining whether to automatically update the system language such that the system language is set to the main language based on a machine learning algorithm or a deep learning algorithm. The main language determination model may include an artificial neural network (ANN).

The main language determination model may be trained by the processor 170 or the learning processor 160 of the display device 100, or may be trained by the processor 460 or the learning processor 440 of the AI server 400. Furthermore, the main language determination model may be trained not only by the processor 170 or the learning processor 160 of the display device 100, but also by the processor 460 or the learning processor 440 of the AI server 400.

Then, the processor 170 of the display device 100 may determine whether the system language and the main language are the same (S605).

The system language of the display device 100 may mean a language set in the display device 100, and may include a language displayed in a menu, a language displayed in help, a language set in an application, a voice assistant language, an audio guide language, and the like.

The system language of the display device 100 may include a system text language and a system voice language. It is preferable that the system text language and the system voice language be set to be the same, but, generally, the system text language and the system voice language may be set differently in that the supported system text language is more than the supported system voice language.

When it is determined in step S605 that the system language and the main language are the same, the processor 170 of the display device 100 may terminate the process without changing the set system language.

When it is determined in step S605 that the system language and the main language are different from each other, the processor 170 of the display device 100 may determine whether a language update mode is an automatic update mode (S607).

The language update mode may mean a mode for setting whether to automatically update the set system language when the system language and the main language are different from each other. The processor 170 may perform a process of updating the set system language based on the set language update mode.

When it is determined in step S607 that the set language update mode is the automatic update mode, the processor 170 of the display device 100 may automatically change the system language such that the system language is set to the main language (S609).

The automatic update mode may mean a mode for automatically updating the system language. Accordingly, when the set language update mode is the automatic update mode, the processor 170 may update the system language such that the system language is set to the determined main language without asking the user whether to update the system language.

However, when the processor 170 automatically changes the system language without asking the user's intention, a situation in which the system language change is against the user's will may occur. Accordingly, in an embodiment, after automatically changing the system language, the processor 170 may output a notification indicating that the system language is automatically changed through the display 180, and the output notification may include an item to cancel the change of the system language.

When it is determined in step S607 that the set language update mode is not the automatic update mode (that is, when the set language update mode is the manual update mode), the processor 170 of the display device 100 may output a notification suggesting update of the system language through the display 180 (S611), and determine whether the user's response is to accept the update (S613).

The manual update mode may mean a mode in which an update of the system language is suggested to the user and the system language is updated when the user makes an agreement with the update. Accordingly, when the set language update mode is the manual update mode, the processor 170 may suggest update of the system language to the user, and determine whether to update the system language based on the user's response.

The notification suggesting update of the system language may include at least one of information on a currently set system language, information on a main language to be updated, an item accepting update, or an item refusing update.

The notification suggesting the update of the system language may be provided in two languages: a currently set system language and a main language to be updated. For example, when the currently set system language is English and the main language to be updated is Korean, the processor 170 may output a notification suggesting change of the system language from English to Korean through the display 180 in both English and Korean or in a manner of alternating English and Korean.

When it is determined in step S613 that the user's response is to accept the update of the system language, the processor 170 of the display device 100 may change the system language such that the system language is set to the main language (S615), and generate learning data from the system language update record (S617).

After changing the system language to the main language, the processor 170 may output a notification indicating that the system language is set to the main language through the display 180.

When it is determined in step S613 that the user's response is to refuse the update of the system language, the processor 170 of the display device 100 may not change the system language such that the system language is set to the main language, and generate learning data from the system language update record (S617).

The learning data may include language usage information, a previously set system language, a main language, and whether the system language is updated. The generated learning data may be used for training the main language determination model.

The processor 170 or the learning processor 160 of the display device 100 may update the main language determination model by using the generated learning data, and store the updated main language determination model in the memory 140. Alternatively, the processor 170 of the display device 100 may transmit the generated learning data through the communication interface 110 to the AI server 400. The processor 460 or the learning processor 440 of the AI server 400 may update the main language determination model using the learning data, and the processor 170 of the display device 100 may receive the updated main language determination model from the AI server 400 through the communication interface 110 and store the updated main language determination model in the memory 140.

The order of the steps shown in FIG. 6 is only an example, and the present disclosure is not limited thereto. That is, according to an embodiment, the order of some of the steps shown in FIG. 6 may be reversed to be performed.

In an embodiment, some of the steps shown in FIG. 6 may be performed in parallel. Further, only some of the steps shown in FIG. 6 may be performed.

FIG. 6 illustrates only one cycle of a method of operating the display device 100, and the present disclosure is not limited thereto. That is, the steps shown in FIG. 6 may be repeatedly performed.

Figure 7:
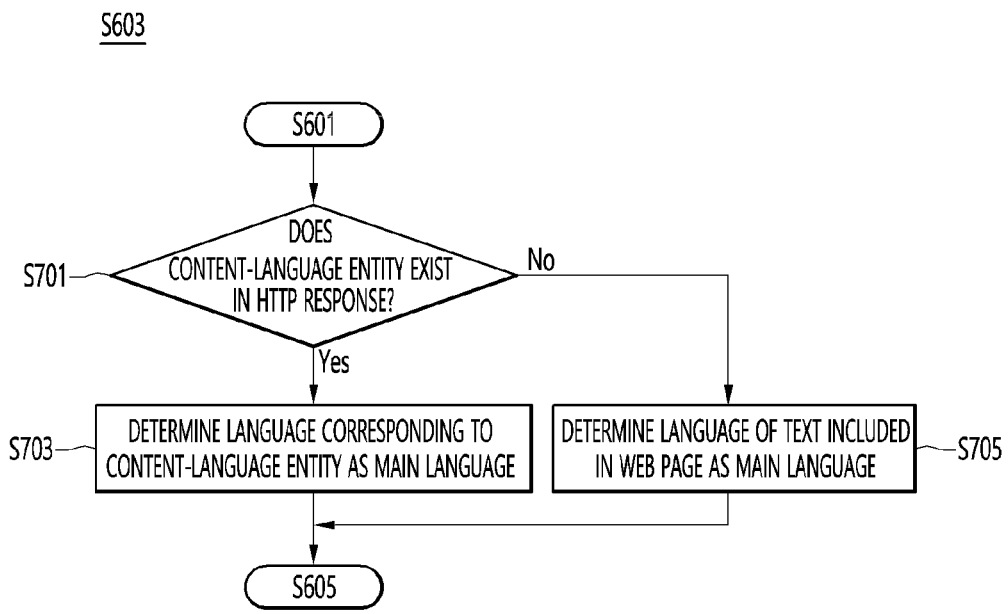
FIG. 7 is an operation flowchart illustrating an example of a step S603 of determining a main language based on the language usage information shown in FIG. 6.

FIG. 7 is an operation flowchart illustrating an example of a step S603 of determining a main language based on the language usage information shown in FIG. 6.

Specifically, FIG. 7 illustrates an embodiment in which the display device 100 determines a main language according to a rule-based determination method in a situation in which language usage information according to web browsing is received.

Referring to FIG. 7, the processor 170 of the display device 100 may determine whether a content-language entity exists in an HTTP response (S701).

The content-language entity may represent the language of a web site. Accordingly, the language of the web site that the user visits while browsing the web may be regarded as the main language of the user.

When it is determined in step S701 that the content-language entity exists in the HTTP response, the processor 170 of the display device 100 may determine a language corresponding to the content-language entity as the main language (S703).

When it is determined in step S701 that the content-language entity does not exist in the HTTP response, the processor 170 of the display device 100 may determine the language of text included in the web page as the main language (S705).

Even when no content-language entity is present in the HTTP response, the web page may contain text. Accordingly, the processor 170 may analyze the language of text included in the web page and determine the corresponding language as the user's main language.

When the text included in the web page is composed of a plurality of languages, the processor 170 may determine the language representing the most frequency among languages of the text included in the web page as the user's main language.

Figure 8:
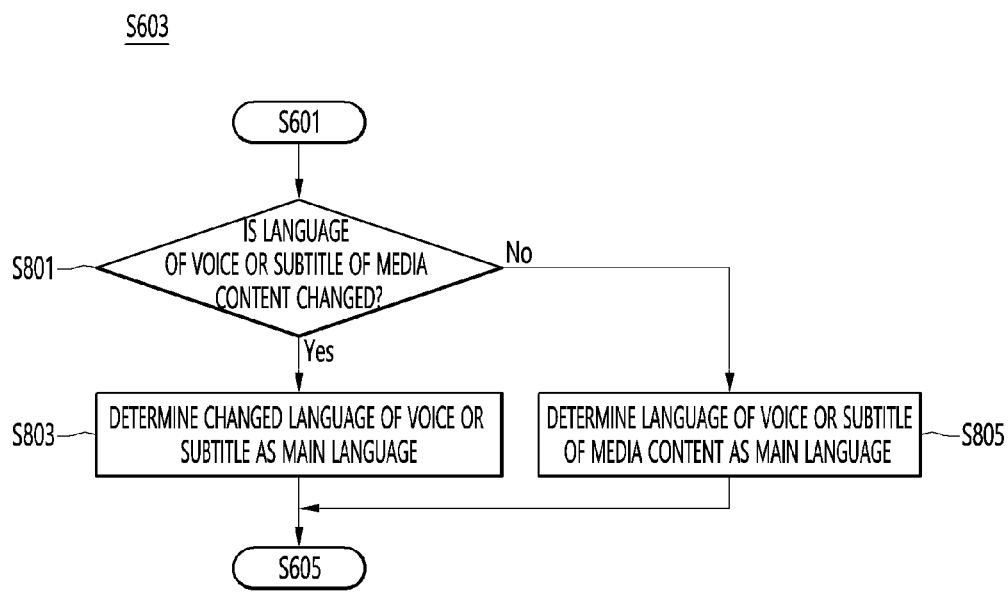
FIG. 8 is an operation flowchart illustrating an example of a step S603 of determining a main language based on the language usage information shown in FIG. 6.

FIG. 8 is an operation flowchart illustrating an example of a step S603 of determining a main language based on the language usage information shown in FIG. 6.

Specifically, FIG. 8 illustrates an embodiment in which the display device 100 determines a main language according to a rule-based determination method in a situation in which language usage information according to output of media content is received.

Referring to FIG. 8, the processor 170 of the display device 100 may determine whether the language of the voice or subtitle of media content is changed (S801).

In media content, the language of the voice is basically fixed, but in some cases, the language of the voice may be selected from among several candidate languages. Therefore, when the language of voice of the media content is changed, it can be seen that the user prefers the language of the voice after the change to the language of the voice before the change.

However, since the number of languages of the voice provided by the media content is insufficient compared to the number of the languages of the subtitle provided by the media content, it may be difficult to see that the voice language represents the user's main language. Accordingly, it can be seen that the language of the subtitle of the media content has a higher priority than the language of the voice of the media content.

When it is determined in step S801 that the language of the voice or subtitle of the media content is changed, the processor 170 of the display device 100 may determine the changed language of the voice or the changed language of the subtitle as the main language (S803).

In an embodiment, as described above, the language of the subtitle of the media content may have a higher priority than the language of the voice of the media content. When both the language of the voice and the language of the subtitle are changed, the processor 170 may determine the changed language of the subtitle as the main language.

When it is determined in step S803 that the language of the voice or subtitle of the media content is not changed, the processor 170 of the display device 100 may determine the language of the voice or subtitle of the media content as the main language (S805).

In an embodiment, as described above, the language of the subtitle of the media content may have a higher priority than the language of the voice of the media content. When the language of the voice and the language of the subtitle are different from each other, the processor 170 may determine the language of the subtitle as the main language.

Figure 9:
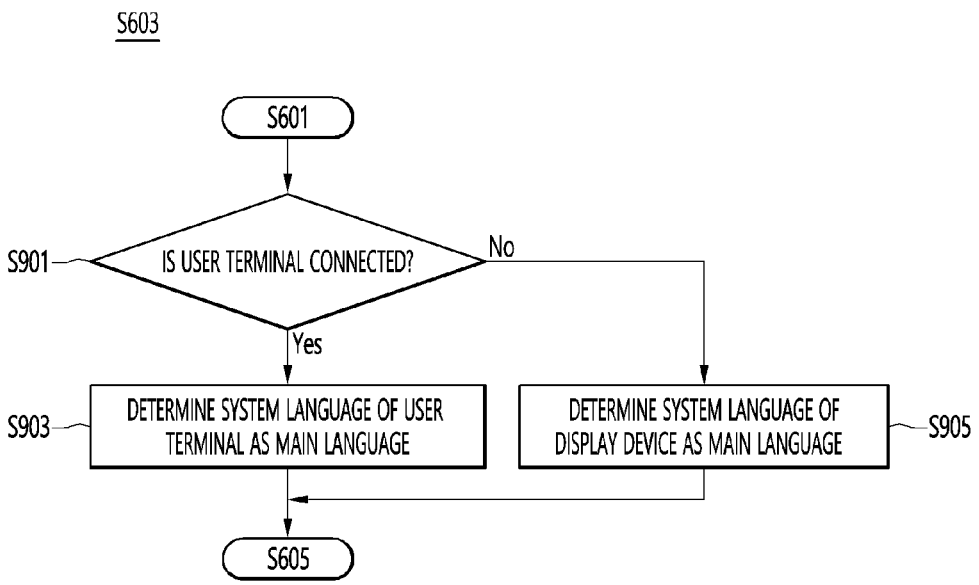
FIG. 9 is an operation flowchart illustrating an example of a step S603 of determining a main language based on the language usage information shown in FIG. 6.

FIG. 9 is an operation flowchart illustrating an example of a step S603 of determining a main language based on the language usage information shown in FIG. 6.

Specifically, FIG. 9 illustrates an embodiment in which the display device 100 determines a main language according to a rule-based determination method in a situation in which language usage information according to interworking with the user terminal 300 is received.

Referring to FIG. 9, the processor 170 of the display device 100 may determine whether the display device 100 is connected to the user terminal 300 (S901).

The display device 100 and the user terminal 300 may be connected through a pairing process, and the connection between the two devices means that two devices have been currently connected.

When it is determined in step S901 that the display device 100 is connected to the user terminal 300, the processor 170 of the display device 100 may determine the system language of the connected user terminal 300 as the main language (S903).

When it is determined in step S901 that the display device 100 is not connected to the user terminal 300, the processor 170 of the display device 100 may determine the system language of the display device 100 as the main language (S905).

This may mean that the system language of the user terminal 300 cannot be determined as the main language because the connected user terminal 300 does not exist.

FIGS. 7 to 9 described above show examples of determining the user's main language by independently considering the user's each language usage information, but the present disclosure is not limited thereto. In contrast, FIG. 10, which will be described later, shows examples of determining a main language by comprehensively considering various pieces of language usage information of a user.

Figure 10:
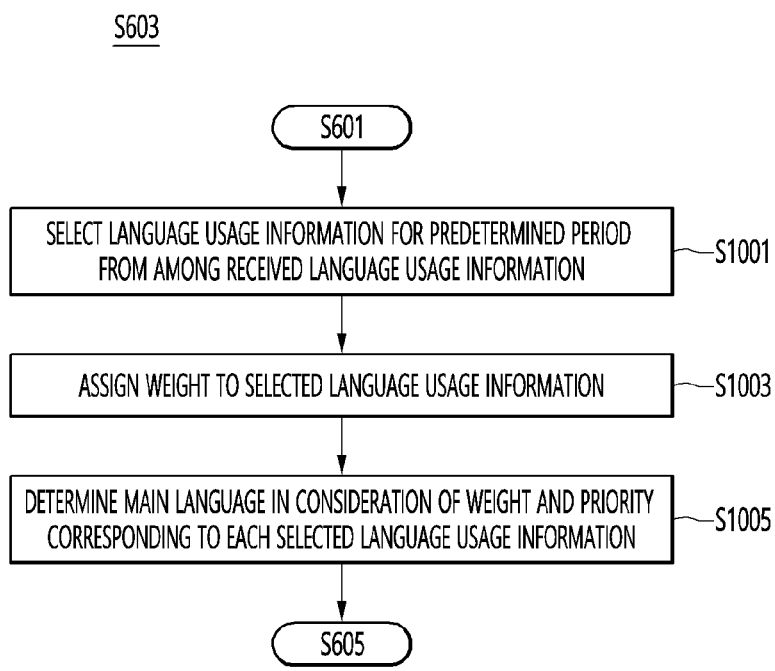
FIG. 10 is an operation flowchart illustrating an example of a step S603 of determining a main language based on the language usage information shown in FIG. 6.

FIG. 10 is an operation flowchart illustrating an example of a step S603 of determining a main language based on the language usage information shown in FIG. 6.

Specifically, FIG. 10 illustrates an embodiment in which the display device 100 determines a main language in consideration of a plurality of pieces of language usage information according to a rule-based determination method.

Referring to FIG. 10, the processor 170 of the display device 100 may select language usage information during a predetermined period from among the received pieces of language usage information (S1001).

The predetermined period may mean a period from the present time point to a certain time point in the past. For example, the predetermined period may mean a period from the current time point to 60 minutes before. This means that the recent language usage information has a high the importance in determining the current main language of the user.

Then, the processor 170 of the display device 100 may assign a weight for each selected language usage information (S1003).

The processor 170 may assign a weight for each selected language usage information in consideration of the type of language usage information and time information.

The processor 170 may assign a lower weight (or time weight) for each language usage information as the elapsed time is longer. Conversely, the processor 170 may assign a higher weight for each language usage information as the elapsed time is shorter.

The operation of selecting language usage information during a predetermined period in step S1001 may also be viewed as assigning a weight of 0 for language usage information that does not belong within the predetermined period, in that the processor 170 assigns a weight for the language usage information based on the elapsed time. That is, the step (S1001) of selecting language usage information for the predetermined period may be viewed as a part of a process of assigning a weight for each language usage information.

The processor 170 may assign a weight (or type weight) for each language usage information in consideration of the type of language usage information. A weight may be preset for each type of language usage information. For example, the weight of the content-language entity of the web site may be set higher than the weight of the language of text included in the web page.

The processor 170 may calculate an overall weight based on a time weight and a type weight assigned for each language usage information. For example, the processor 170 may calculate the overall weight by multiplying the time weight and the type weight assigned for each language usage information.

Then, the processor 170 of the display device 100 may determine a main language in consideration of a weight and a priority corresponding to each selected language usage information (S1005).

The processor 170 may determine a main language by performing comparison on pieces of language usage information having the highest priority with respect to each selected language usage information, and a language having the largest sum of weights (or the sum of scores) may be determined as the main language based on the assigned weights with respect to the pieces of language usage information having the same priority. For example, when the first language usage information is the first priority, the second language usage information is the second priority, a language corresponding to the first language usage information is English, and a language corresponding to the second language usage information is Korean, the processor 170 may determine English, which is a language corresponding to the first language usage information with the first priority, as the main language. On the other hand, when both the first language usage information and the second language usage information have second priority, the language corresponding to the first language usage information is English, and the language corresponding to the second language usage information is Korean, the processor 170 may determine a language having a higher weight among the weight of the first language usage information and the weight of the second language usage information as the main language. Here, the weight may mean an overall weight.

When the processor 170 determines the main language, the priority may be considered preferentially compared to the weight. Therefore, even when the weight assigned to the first language usage information with the first priority, is lower than the weight assigned the second language usage information with the second priority, the processor 170 may determine a language corresponding to the first language usage information with the first priority as a main language.

A priority may be preset for each type of language usage information. For example, the system language of the user terminal 300 may have a first priority, the language of the user's spoken voice may have a second priority, and other language usage information may have a third priority.

Each language usage information may be assigned a weight (or type weight) and a priority based on the type, and the weight and the priority may be set to have a strong positive correlation. That is, the language usage information with a high priority may be set to have a high type weight. Therefore, in another embodiment, the main language may be determined by considering only the weight without considering the priority of each language usage information.

FIG. 11 is a diagram illustrating an example of weights and priorities assigned to types of language usage information.

As described above, the weight and the priority may be set to have a high positive correlation. Further, according to an embodiment, both the weight and the priority may be considered, or only the weight may be considered. On the other hand, only the priority may be considered according to an embodiment.

The weight values to be described below are merely examples, and the values may be variously changed accordingly to embodiments.

Referring to FIG. 11, a weight 1120 and a priority 1130 may be assigned to each language usage information based on the type 1110 of the language usage information.

For example, the system language 1111 of the user terminal 300 may be assigned a first priority, which is the highest priority, and a weight of 1, which is higher than other language usage information. The language 1112 of a user's spoken voice may be assigned a second priority and a weight of 0.5. The language 1113 of subtitle of media content may be assigned a third priority and a weight of 0.3. The language 1114 of voice of media content may be assigned a fifth priority, and a weight of 0.1. The content-language entity 1115 of a web site may be assigned a third priority, and a weight of 0.15. The language 1116 of text included in a web page may be assigned a fourth priority, and a weight of 0.05.

FIG. 12 is an operation flowchart illustrating an example of a step S603 of determining a main language based on the language usage information shown in FIG. 6.

Specifically, FIG. 12 illustrates an embodiment in which the display device 100 determines a main language in consideration of a plurality of pieces of language usage information according to a learning-based determination method.

Referring to FIG. 12, the processor 170 of the display device 100 may select language usage information during a predetermined time period from among the received pieces of language usage information (S1201).

The predetermined period may mean a period from the present time point to a certain time point in the past. For example, the predetermined period may mean a period from the current time point to 60 minutes before.

The processor 170 of the display device 100 may determine the main language from the selected language usage information by using the main language determination model (S1203).

The main language determination model may refer to an artificial intelligence model that determines and outputs a main language corresponding to input language usage information when the language usage information is input.

In an embodiment, the processor 170 may receive (or collect) the user's language usage information in real time, and determine the main language by inputting the received language usage information into the main language determination model. That is, language usage information is input to the main language determination model in a time series, and the main language determination model may determine a main language corresponding to the language usage information input in a time series. To this end, the main language determination model may include a Recurrent Neural Network (RNN).

The main language determination model may be trained based on learning data labeled with language usage information and a corresponding main language. When the system language of the display device 100 is changed, or when the change of the system language of the display device 100 is tried but the user refuses to change the system language and then the system language has not been changed, the learning data used to train the main language determination model is generated. For example, when the processor 170 automatically changes the system language from the first language to the second language in a specific situation, but the user refuses to change the system language (that is, the system language is returned from the second language to the first language), the processor 170 may generate learning data by labeling a language usage record corresponding to the corresponding situation with the first language.

Figure 13:
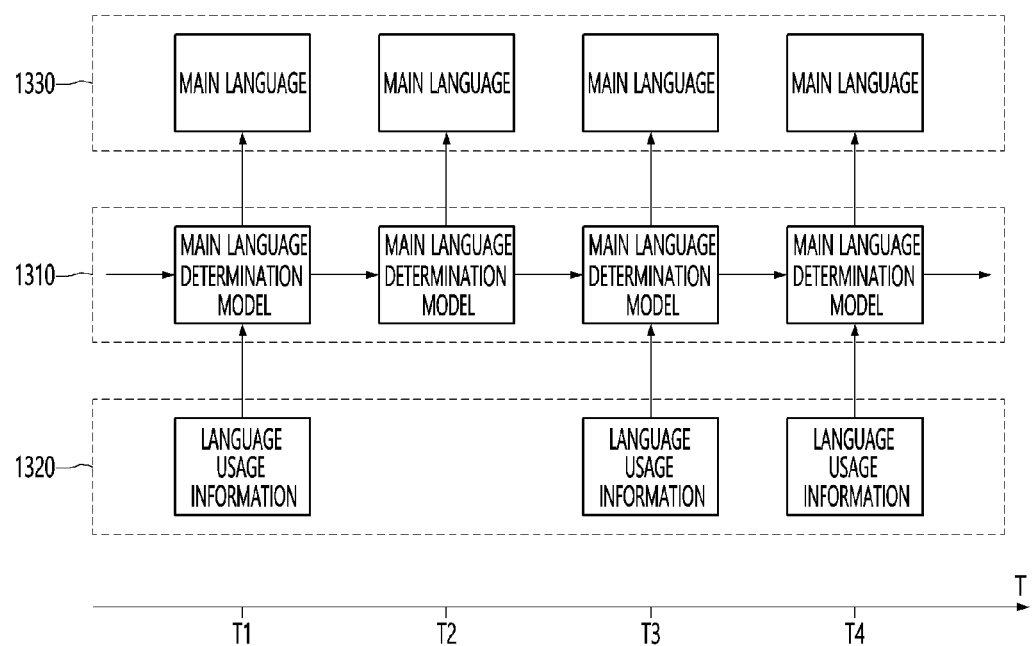
FIG. 13 is a diagram illustrating an example of a main language determination model according to an embodiment of the present disclosure.

FIG. 13 is a diagram illustrating an example of a main language determination model according to an embodiment of the present disclosure.

Referring to FIG. 13, a main language determination model 1310 may include an RNN, and when language usage information 1320 is input in time series, output a main language 1330 corresponding to the language usage information 1320. Since the main language determination model 1310 includes the RNN, the main language model 1310 may determine the main language 1330 based on the values propagated from the main language determination model 1310 at the previous time point as well as the language usage information 1320 at a corresponding time point.

For example, when the language usage information 1320 is input to the main language determination model 1310 at the time point T1, the main language determination model 1310 may determine a main language 1330 at time point T1 based on input language usage information 1320 and the values propagated from the main language determination model 1310 at a time point immediately before T1, and output the determined main language 1330.

Even when the language usage information 1320 is not input to the main language determination model 1310 at time point T2, the main language determination model 1310 may determine the main language 1330 at time point T2 based on values propagated from the main language determination model 1310 at time point T1, and output the determined main language 1330. In this case, since the language usage information 1320 is not input at time point T2, it is preferable that the main language determination model 1310 is trained such that the main language 1330 output at the time point T2 is the same as the main language 1330 determined at time point T1.

For example, when the language usage information 1320 is input to the main language determination model 1310 at time point T3, the main language determination model 1310 may determine the main language 1330 at time point T3 based on input language usage information 1320 and the values propagated from the main language determination model 1310 at time point T2, and output the determined main language 1330.

FIG. 13 is a diagram illustrating an embodiment in which the main language determination model 1310 includes an RNN, but the present disclosure is not limited thereto. That is, in various embodiments of the present disclosure, the main language determination model 1310 may be composed of an artificial neural network that does not include an RNN.

Figure 14:
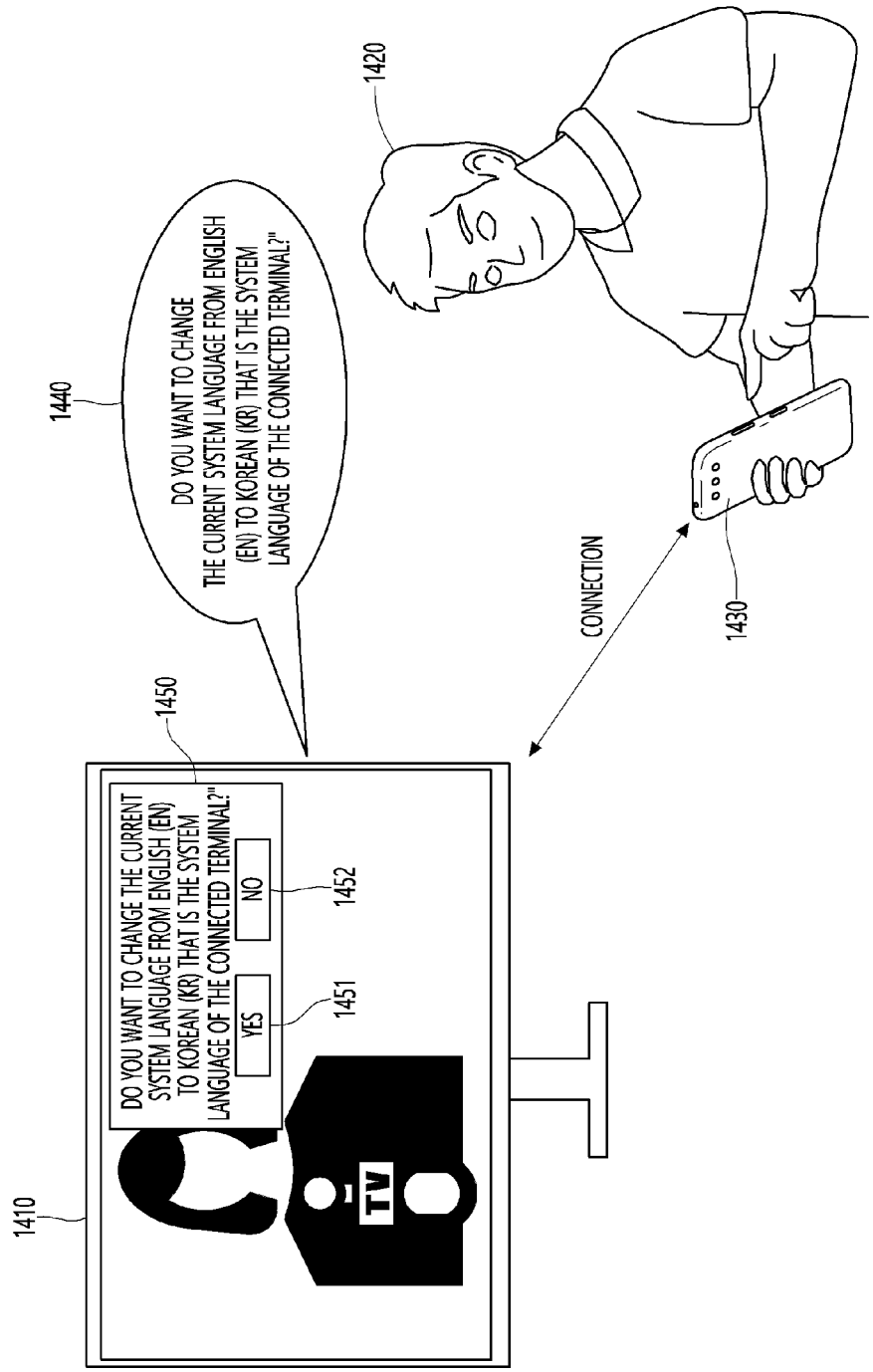
FIG. 14 is a diagram illustrating an embodiment of the present disclosure.

FIG. 14 is a diagram illustrating an embodiment of the present disclosure.

Specifically, FIG. 14 illustrates an embodiment in a case where the language update mode of the display device 1410 is a manual update mode.

Referring to FIG. 14, when a terminal 1430 of a user 1420 is connected to a display device 1410, the display device 1410 may determine the main language of the user 1420 as the system language of the terminal 1430. In addition, the display device 1410 may determine whether the set system language and the determined main language are the same. When the system language of the display device 1410 is English (EN), the system language of the terminal 1430 is Korean (KR), and then the two system languages are different from each other, the display device 1410 may provide a suggestion of changing the currently set system language 'English (EN)' to the system language 'Korean (KR)' of the connected terminal.

The display device 1410 may provide the suggestion of changing the system language in the manner of at least one of a voice notification 1440 and an image notification 1450.

The display device 1410 may provide a suggestion of changing the system language by outputting the voice notification 1440 of "Do you want to change the current system language from English (EN) to Korean (KR) that is the system language of the connected terminal?" or "Do you want to change the current system language from English (EN) to Korean (KR)?" and determine whether to change the system language based on the voice response of the user 1420 corresponding to the suggestion.

The display device 1410 may provide a suggestion of changing the system language by outputting the image notification 1450 including a message of Do you want to change the current system language from English (EN) to Korean (KR) that is the system language of the connected terminal?" or "Do you want to change the current system language from English (EN) to Korean (KR)?", an acceptance Item 1451, and a refusal Item 1452 and determine whether to change the system language based on an input of the user 1420 corresponding to the suggestion. In this case, the user 1420 may apply an input for selecting the acceptance item 1451 or the refusal item 1452 using the remote control device 200.

When the display device 1410 provides the user 1420 with the suggestion of changing the system language but does not receive a response within a predetermined time, the display device 1410 may determine not to change the system language.

When the display device 1410 provides the user 1420 with a suggestion to change the system language, the display device 1410 may generate learning data including the language usage record of the user 1420 and whether the system language has been changed, and the generated learning data may be used to train the main language determination model.

Figure 15:
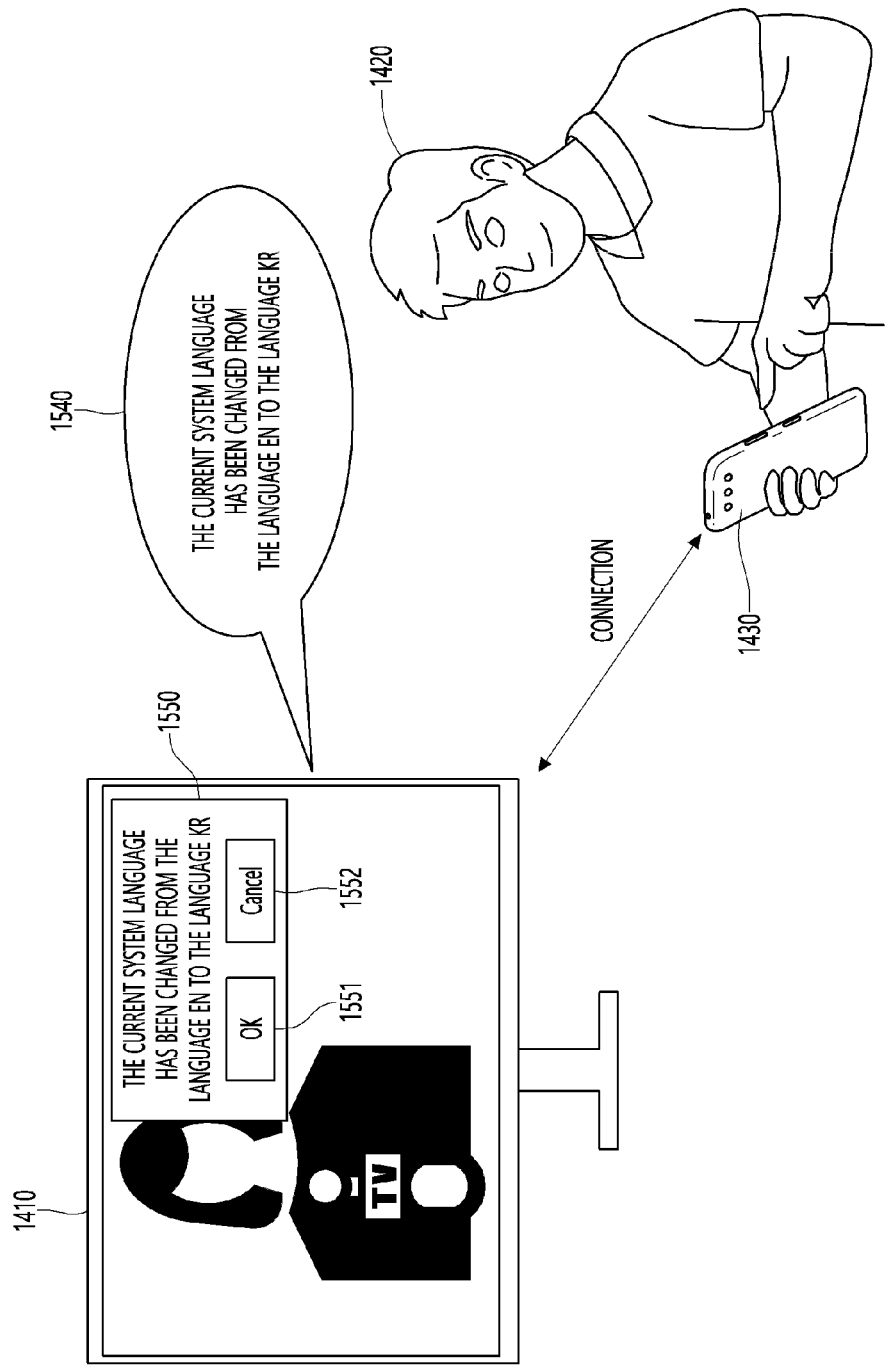
FIG. 15 is a diagram illustrating an embodiment of the present disclosure.

FIG. 15 is a diagram illustrating an embodiment of the present disclosure.

Specifically, FIG. 15 illustrates an embodiment in a case where the language update mode of the display device 1410 is an automatic update mode.

Referring to FIG. 15, when the terminal 1430 of the user 1420 is connected to the display device 1410, the display device 1410 may determine whether the set system language and the system language of the connected terminal 1430 are identical to each other. When the system language of the display device 1410 is English (EN), the system language of the terminal 1430 is Korean (KR), and then the two system languages are different from each other, the display device 1410 may change the currently set system language from 'English (EN)' to 'Korean (KR)' that is the system language of the connected terminal and provide a notification indicating that the system language has been changed (or notification indicating completion of change of the system language).

Alternatively, the display device 1410 may receive the language usage information of the user 1420 including the set system language from the connected terminal 1430, and determine the main language of the user 1420 using the received language usage information and the main language determination model. When it is determined that the main language of the user 1420 is 'Korean (KR)', the display device 1410 may change the currently set system language from 'English (EN)' to 'Korean (KR)' that is the determined main language. and may provide a notification indicating that the system language has been changed.

The display device 1410 may provide the notification indicating completion of change of the system language in the manner of at least one of a voice notification 1540 and an image notification 1550.

The display device 1410 may output a voice notification 1540 of "The current system language has been changed from the language EN to the language KR" to provide a notification indicating completion of change of the system language. The display device 1410 may or may not cancel the operation of changing the system language based on the voice response of the user 1420 after the notification indicating completion of change of the system language is provided.

The display device 1410 may output a message "The current system language has been changed from the language EN to the language KR" and an image notification 1550 including an OK item 1551 and a cancel item 1552 to provide the notification indicating the completion of change of the system language and may or may not cancel the operation of changing the system language based on a corresponding input of the user 1420. In this case, the user 1420 may apply an input for selecting the OK item 1551 or the cancel item 1552 using the remote control device 200.

When the display device 1410 provides the user 1420 with the notification indicating the completion of change of the system language but does not receive a response within a predetermined time, the display device 1410 may determine not to cancel the operation of changing the system language.

When the display device 1410 provides the user 1420 with the notification indicating the completion of change of the system language or changes the system language, the display device 1410 may generate learning data including the language usage record of the user 1420 and whether the operation of changing the system language is canceled, and the generated learning data may be used to train the main language determination model.

In the embodiments of FIGS. 14 and 15, the display device 1410 may determine the main language of the user 1420 based on the language usage record in the terminal 1430 as well as the system language of the terminal 1430 of the user 1420. The language usage record in the terminal 1430 may include the language of text included in a web page during web browsing in the terminal 1430, a content-language entity of a web site, and the like.

Figure 16:
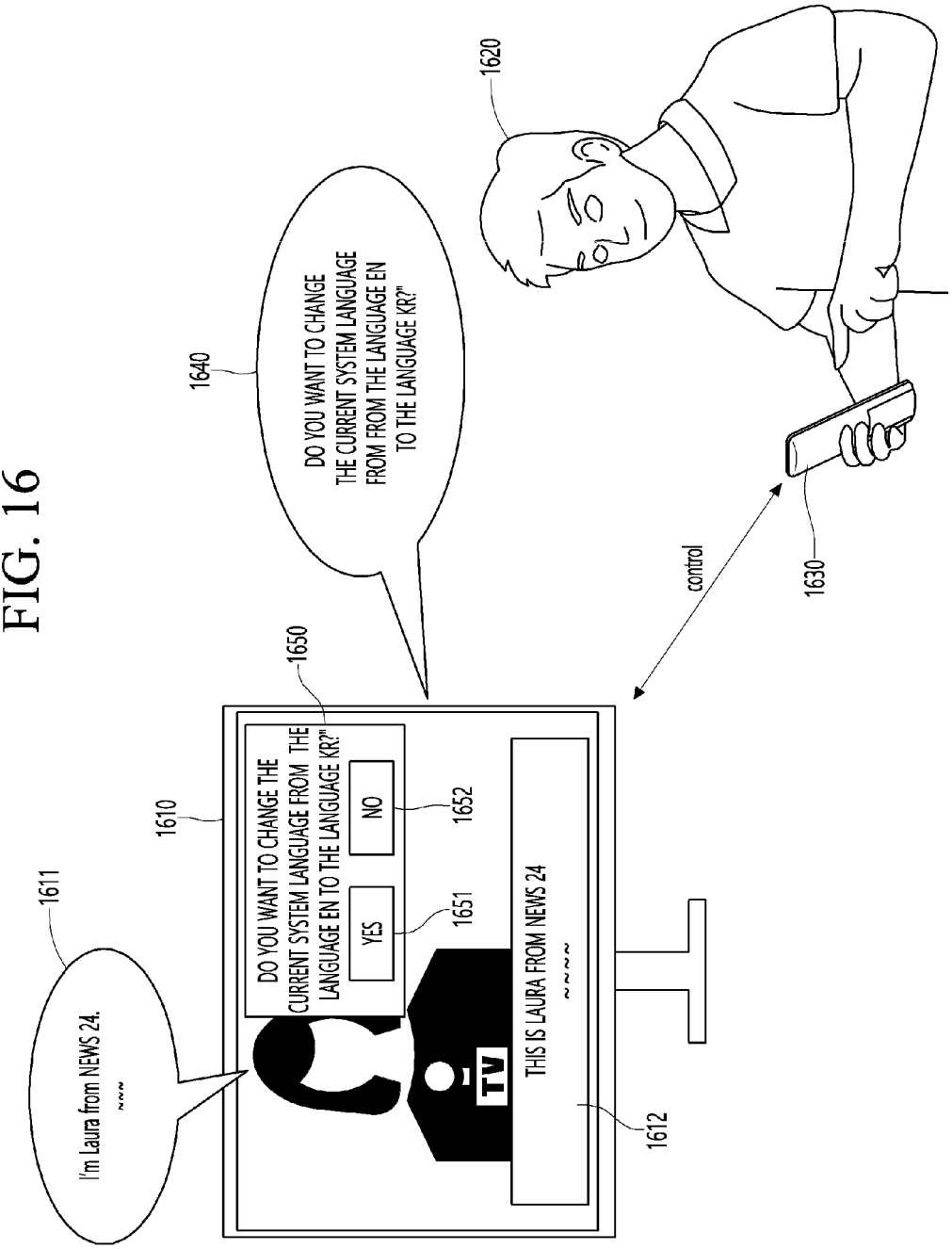
FIG. 16 is a diagram illustrating an embodiment of the present disclosure.

FIG. 16 is a diagram illustrating an embodiment of the present disclosure. Specifically, FIG. 16 illustrates an embodiment in a case where the language update mode of the display device 1410 is a manual update mode.

Referring to FIG. 16, a remote control device 1630 may be connected to a display device 1610, and the display device 1610 may be controlled by the remote control device 1630. When the user 1620 performs control to change the language of the subtitle of media content of the display device 1610 through the remote control device 1630, the display device 1610 may determine the language of the subtitle of the media content as the main language of the user 1620. In addition, the display device 1610 may determine whether the set system language and the determined main language are the same. When the system language of the display device 1610 is English (EN), the language of the voice 1611 of the media content provided by the display device 1610 is English (EN), and the language of the subtitle 1612 of the media content set by the user 1620 is Korean (KR), the display device 1610 may provide a system language change suggestion of changing the currently set system language 'English (EN)' to the language 'Korean (KR)' of the subtitle 1612 of the media content.

The display device 1610 may provide the suggestion of changing the system language in the manner of at least one of a voice notification 1640 and an image notification 1650.

The display device 1610 may provide a suggestion of changing the system language by outputting the voice notification 1640 of "Do you want to change the current system language from the language EN to the language KR ?" and determine whether to change the system language based on the voice response of the user 1620 corresponding to the suggestion.

The display device 1610 may provide a suggestion of changing the system language by outputting the image notification 1650 including a message of "Do you want to change the current system language from the language EN to the language KR?", an acceptance Item 1651, and a refusal Item 1652 and determine whether to change the system language based on an input of the user 1620 corresponding to the suggestion. In this case, the user 1620 may apply an input for selecting the acceptance item 1651 or the refusal item 1652 using the remote control device 200.

When the display device 1610 provides the user 1620 with the suggestion of changing the system language but does not receive a response within a predetermined time, the display device 1410 may determine not to change the system language.

When the display device 1610 provides the user 1620 with a suggestion to change the system language, the display device 1610 may generate learning data including the language usage record of the user 1620 and whether the system language has been changed, and the generated learning data may be used to train the main language determination model.

Figure 17:
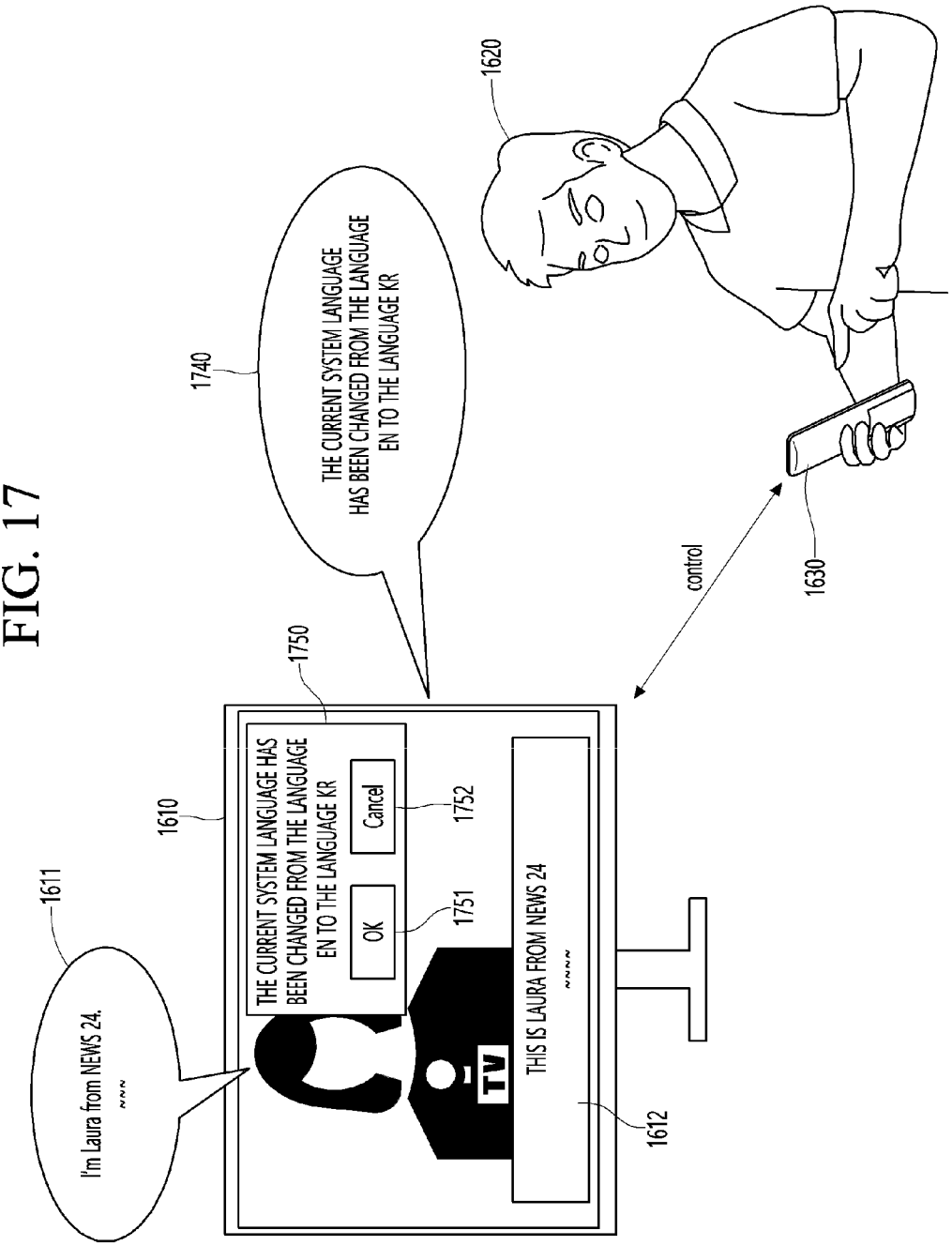
FIG. 17 is a diagram illustrating an embodiment of the present disclosure.

FIG. 17 shows an embodiment of the present disclosure.

Referring to FIG. 17, a remote control device 1630 may be connected to a display device 1610, and the display device 1610 may be controlled by the remote control device 1630. When the user 1620 performs control to change the language of the subtitle of media content of the display device 1610 through the remote control device 1630, the display device 1610 may determine the language of the subtitle of the media content as the main language of the user 1620. In addition, the display device 1610 may determine whether the set system language and the determined main language are the same. When the system language of the display device 1610 is English (EN), the language of the voice 1611 of the media content provided by the display device 1610 is English (EN), and the language of the subtitle 1612 of the media content set by the user 1620 is Korean (KR), the display device 1610 may change the currently set system language from 'English (EN)' to the language 'Korean (KR)' of the subtitle 1612 of the media content and provide a notification indicating that the system language has been changed.

Alternatively, the display device 1610 may receive the language usage information of the user 1620 including the language of subtitle 1612 of media content changed by the control of the connected remote control device 1630, and determine the main language of the user 1620 using the received language usage information and the main language determination model. When it is determined that the main language of the user 1620 is 'Korean (KR)', the display device 1610 may change the currently set system language from 'English (EN)' to 'Korean (KR)' that is the determined main language. and may provide a notification indicating that the system language has been changed.

The display device 1610 may provide the notification indicating completion of change of the system language in the manner of at least one of a voice notification 1740 and an image notification 1750.

The display device 1610 may output a voice notification 1740 of "The current system language has been changed from the language EN to the language KR" to provide a notification indicating completion of change of the system language. The display device 1610 may or may not cancel the operation of changing the system language based on the voice response of the user 1620 after the notification indicating completion of change of the system language is provided.

The display device 1610 may output a message "The current system language (EN) has been changed from the language EN to the language KR" and an image notification 1750 including an OK item 1751 and a refusal item 1752 to provide the notification indicating the completion of change of the system language and may or may not cancel the operation of changing the system language based on a corresponding input of the user 1620. In this case, the user 1620 may apply an input for selecting the OK item 1751 or the cancel item 1752 using the remote control device 200.

When the display device 1610 provides the user 1620 with the notification indicating the completion of change of the system language but does not receive a response within a predetermined time, the display device 1410 may determine not to cancel the operation of changing the system language.

When the display device 1610 provides the user 1620 with the notification indicating the completion of change of the system language or changes the system language, the display device 1610 may generate learning data including the language usage record of the user 1620 and whether the operation of changing the system language is canceled, and the generated learning data may be used to train the main language determination model.

Although FIGS. 16 and 17 illustrate examples in which the language of the voice 1611 of the media content is different from the language of the subtitle 1612 of the media content, the present disclosure is not limited thereto. That is, in various embodiments of the present disclosure, even when the language of the subtitle 1612 of the media content is set to be the same as the language of the voice 1611 of the media content, the language of the subtitle 1612 of the media content may be determined as the main language.

According to an embodiment of the present disclosure, the above-described method may be implemented with codes readable by a computer on a medium in which a program is recorded. The computer-readable medium includes all kinds of recording devices in which data readable by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like.

The invention claimed is:

1. A display device comprising:
   a display;
   a communication interface configured to communicate with an external device; and
   a processor configured to receive language usage information of a user, determine a main language of the user based on the language usage information, compare a set system language with the main language, and when the system language is different from the main language, change the system language such that the system language is set to the main language or perform suggestion that the system language is set to the main language,
   wherein the processor is configured to select language usage information for a predetermined period from among the language usage information, assign a weight to each of the selected language usage information, and determine the main language in consideration of the weight corresponding to each of the selected language usage information.

2. The display device of claim 1, wherein the language usage information includes at least one of a content-language entity of an HTTP response received from a website, language information of text included in a web page, language information of voice of media content, language information of subtitles of the media content, language information of the user's spoken voice, and system language information of a user terminal.

3. The display device of claim 1, wherein the processor is configured to assign a higher time weight to each of the selected language usage information as an elapsed time is shorter, assign a predetermined type weight to each of the selected language usage information for each type of language usage information, and calculate an overall weight based on the time weight and the type weight.

4. The display device of claim 3, wherein the processor is configured to calculate a sum of the overall weights for each language based on the overall weight calculated for each of the selected language usage information, and determine a language having a largest sum of the overall weights as the main language.

5. The display device of claim 1, wherein the processor is configured to determine the main language in consideration of a weight corresponding to the selected language usage information and a predetermined priority for each type of language usage information.

6. The display device of claim 5, wherein the processor is configured to select a first language usage information having a highest priority from among the selected language usage information, and determine the main language in consideration of a weight of the first language usage information.

7. The display device of claim 5, wherein a priority of the system language of the user terminal is higher than a priority of another language usage information, and a priority of the language of the subtitles of the media content is higher than a priority of the language of the voice of the media content.

8. The display device of claim 1, wherein the processor is configured to select language usage information for a predetermined period from among the language usage information, and determine the main language using the selected language usage information and a main language determination model, and
   wherein the main language determination model is a model including an artificial neural network (ANN), the model being trained based on a machine learning algorithm or a deep learning algorithm.

9. The display device of claim 8, wherein the main language determination model is a model that includes a Recurrent Neural Network (RNN), and determines and outputs the main language when the language usage information is input in real time.

10. The display device of claim 8, wherein the processor is configured to generate learning data corresponding to information on a used language and a result of change when changing or attempting to change the system language, and
    wherein the learning data is used to update the main language determination model.

11. The display device of claim 1, wherein the processor is configured to automatically change the system language such that the system language is set to the main language when the system language and the main language are different from each other, output a first notification indicating that the system language has been changed, and determine whether to cancel change of the system language based on an input of the user corresponding to the first notification in a case where a language update mode is an automatic update mode.

12. The display device of claim 11, wherein the processor is configured to output a second notification suggesting change of the system language such that the system language is set to the main language when the system language and the main language are different from each other, output a first notification indicating that the system language has been changed, and determine whether to change the system language based on an input of the user corresponding to the second notification in a case where the language update mode is a manual update mode.

13. A method for operating a display device comprising:
receiving language usage information of a user;
determining a main language of the user based on the language usage information;
comparing a set system language with the main language; and
changing the system language such that the system language is set to the main language or performing suggestion that the system language is set to the main language, when the system language is different from the main language,
wherein the determining a main language of the user comprises:
selecting language usage information for a predetermined period from among the language usage information,
assigning a weight to each of the selected language usage information, and
determining the main language in consideration of the weight corresponding to each of the selected language usage information.

14. A recording medium recording a method of operating a display device, the method comprises:
receiving language usage information of a user;
determining a main language of the user based on the language usage information;
comparing a set system language with the main language; and
changing the system language such that the system language is set to the main language or performing suggestion that the system language is set to the main language, when the system language is different from the main language,
wherein the determining a main language of the user comprises:
selecting language usage information for a predetermined period from among the language usage information,
assigning a weight to each of the selected language usage information, and
determining the main language in consideration of the weight corresponding to each of the selected language usage information.

* * * * *